US 6,553,033 B1

(12) United States Patent
Wallmeier

(10) Patent No.: US 6,553,033 B1
(45) Date of Patent: Apr. 22, 2003

(54) PROCESS FOR OPTIMIZED TRANSMISSION OF ATM CELLS OVER CONNECTION ELEMENTS

(75) Inventor: Eugen Wallmeier, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/155,678

(22) PCT Filed: Apr. 29, 1997

(86) PCT No.: PCT/DE97/00872

§ 371 (c)(1),
(2), (4) Date: Oct. 1, 1998

(87) PCT Pub. No.: WO97/42788

PCT Pub. Date: Nov. 13, 1997

(30) Foreign Application Priority Data

May 3, 1996 (DE) .......................... 196 17 816

(51) Int. Cl.$^7$ .......................... H04L 12/28; H04L 12/56
(52) U.S. Cl. .................... 370/395.4; 370/535
(58) Field of Search ................. 370/535, 235, 370/229, 230, 232, 233, 234, 235.1, 352, 353, 395.1, 395.4, 413, 419, 536, 537, 542, 395.41, 395.42, 412, 415, 417, 462

(56) References Cited

U.S. PATENT DOCUMENTS

| | | | | | |
|---|---|---|---|---|---|
| 5,390,184 A | * | 2/1995 | Morris | ........................ | 370/353 |
| 5,455,825 A | * | 10/1995 | Lauer et al. | ................. | 370/413 |
| 5,500,858 A | * | 3/1996 | McKeown | ................... | 370/412 |
| 5,533,020 A | * | 7/1996 | Byrn et al. | ............... | 370/395.4 |
| 5,629,937 A | * | 5/1997 | Hayter et al. | ................ | 370/233 |
| 5,677,906 A | * | 10/1997 | Hayter et al. | ................ | 370/235 |
| 5,704,047 A | * | 12/1997 | Schneeberger | ............... | 709/235 |
| 5,828,878 A | * | 10/1998 | Bennett | ....................... | 709/102 |
| 5,862,127 A | * | 1/1999 | Kwak et al. | ................. | 370/233 |
| 5,917,822 A | * | 6/1999 | Lyles et al. | ............... | 370/395.4 |
| 6,229,812 B1 | * | 5/2001 | Parruck et al. | ............. | 370/412 |

FOREIGN PATENT DOCUMENTS

| | | |
|---|---|---|
| DE | 40 07 747 A1 | 9/1991 |
| EP | 0 596 624 A2 | 5/1994 |
| EP | 0 710 046 A2 | 5/1996 |

OTHER PUBLICATIONS

9$^{th}$ ITC Specialists Seminar Teletraffic Modeling and Measurement Broadband and Mobile Communications, Eugen Wallmeier et al, "Traffic Control In ATM Switches With Large Buffers", pp. 45–60.
European Transactions on Telecommunications and Related Technologies, vol. 5, No. 2, Mar./Apr. (1994), Herbert Heiss et al, "Performance Design of an ATM Node on the Basis of the Experience from the BLNT RACE Project", pp. 199–206.
IEEE, Discovering A New World of Communications, Chicago, vol. 2, No. 4, Jun. (1992), Michael G. Hluchyj et al, Queueing Disciplines for Integrated Fast Packet Networks, pp. 990–996.
International Journal of Communication systems, vol. 7, (1994), J. W. Roberts, "Virtual Spacing for Flexible Traffic Control", pp. 307–318.

* cited by examiner

Primary Examiner—Douglas Olms
Assistant Examiner—Phirin Sam
(74) Attorney, Agent, or Firm—Fish & Richardson P.C.

(57) ABSTRACT

The inventive process prevents a loss of ATM cells when processing ATM cells processed in accordance with the WEIGHTED FAIR QUEUEING SCHEDULING process by applying a peak bit rate limiting.

4 Claims, 3 Drawing Sheets

PROCESS FOR OPTIMIZED TRANSMISSION OF ATM CELLS OVER CONNECTION ELEMENTS

BACKGROUND OF THE INVENTION

The invention relates to a process for transmitting ATM cells.

In contemporary ATM systems, information is transmitted in cells. These cells have a header part and an information part. In the header part, the connection information is deposited and in the information part, the user data to be transmitted are deposited. As a rule, the actual transmission takes place via connection elements between transmitter and receiver. In this arrangement, the requirement may exist that the connection elements should be utilized in such a manner that a multiplicity of transmitting devices transmit the cell streams emanating from them via the same connection element.

In order to be able to perform the transmission of the respective cell streams in accordance with the requirements of the individual cell streams, so-called scheduling processes have gained acceptance in the prior art. In these processes, the ATM cells are read out of the buffer memories of a scheduler device in a particular order. The WEIGHTED FAIR QUEUEING SCHEDULING process shall be mentioned as an example of such a scheduling process. The corresponding relationships are mentioned, for example, in the printed document "Spacing for Flexible Traffic Control", J. W. Roberts, International Journal of Communication Systems, Vol. 7, 307 –318 (1994). In this document, individual cell streams are allocated different weighting factors by means of which the actual transmission process is controlled in the individual connection elements. To gain a better understanding, reference is made to FIG. 3.

In this figure, cell streams 1 . . . n are disclosed by way of example. The n cell streams are conducted in the direction of one or more receivers by a transmitting device DEMUX. In practice, only one common connection element is used in this arrangement. The n cell streams are also allocated weighting factors $r_1 \ldots r_n$. To make it simpler to understand, it will be assumed that only two cell streams are to be conducted via one connection element, namely cell streams 1, 2. In addition, the connection element shall have a maximum transmission capacity of 150 Mbit/sec. Both cell streams 1 and 2 are allocated weightings $r_1=2$ and $r_2=1$. The result is that cell stream 1 is transmitted with a transmission rate of 100 Mbit/sec and cell stream 2 is transmitted with only 50 Mbit/sec if cells are present to be transmitted.

The problem with such a procedure is that many of the scheduling processes, such as, for example, the WEIGHTED FAIR QUEUEING SCHEDULING process explained above, cannot ensure peak bit rate limiting on the subsequent connection elements. To prevent any overloading, ATM cells are then discarded. Although this can be tolerated quite easily in the individual case (e.g. telephony), such a procedure should be avoided since it is always associated with a loss of data.

The invention is based on the object of demonstrating an approach of how the cell rates can be optimally matched to the transmission capacity of the connection elements without having to accept the loss of ATM cells.

The invention is achieved by the features of the characterizing clause on the basis of the features specified in the precharacterizing clause of claim 1.

Furthermore, a method for the statistical multiplexing of ATM cells is specified in the printed document "Performance Design of an ATM Node on the Basis of the Experience from the BLNT RACE Project", H. Heiss, E. Wallmeier et al., European Transactions on Telecommunications and Related Technologies, Vol. 5, No. 2, 1,3,49, pages 199–206. In particular, the known leaky bucket process is addressed which utilizes up/down counters. This method cannot be used for efficient processing of the ATM cells since, as a result of this method, ATM cells must always be discarded here.

Furthermore, European Patent Application EP 0 710 046 A2 discloses a device in which ATM cells are supplied to subsequent devices. However, this printed document does not reveal how this is to be performed in detail.

SUMMARY OF THE INVENTION

The invention is based on the object of demonstrating an approach of how the cell rates can be optimally matched to the transmission capacity of the connection elements without having to accept the loss of ATM cells.

In general terms the present invention is a process for the transmission of ATM cells via connection elements. Multiplexing units and/or demultiplexing units and scheduler devices are arranged between these units and have buffer memories. A stream of ATM cells is allocated a multiplicity of virtual channel identifiers and virtual paths combining these virtual channel identifiers. Arbitrarily adjustable weighting factors representative of the transmission capacity on the subsequent connection elements are allocated to the scheduler devices. One of the scheduler devices is selected as determined by the allocated weighting factors. At least one of the ATM cells is taken from one of the buffer memories of the selected scheduler device and is supplied to other devices.

Advantageous developments of the present invention are as follows.

The ATM cells stored in the buffer memories of the scheduler devices are taken by the WEIGHTED FAIR QUEUEING SCHEDULING process.

Real-time ATM cells are supplied via a separate connection element arranged in parallel with the scheduler devices to the multiplexer with higher prioritization than is exhibited by the ATM cells transmitted via the scheduler devices.

The buffer memories are constructed as FIFO memories.

The advantageous feature of the invention is, in particular, the use of a two-stage process which is executed sequentially. In this arrangement, the scheduler devices which have accepted ATM cells as queues in their buffer memories are selected in the first process step of the two-stage process. In the second process step, one of these buffer memories is then selected and at least one of the ATM cells is read out and transmitted. The advantageous feature of this is, in particular, that the first process step limits the peak bit rate of an ATM cell stream having one or more virtual channel identifiers. Furthermore, this process step is independent of the scheduling processes used in the second process step.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
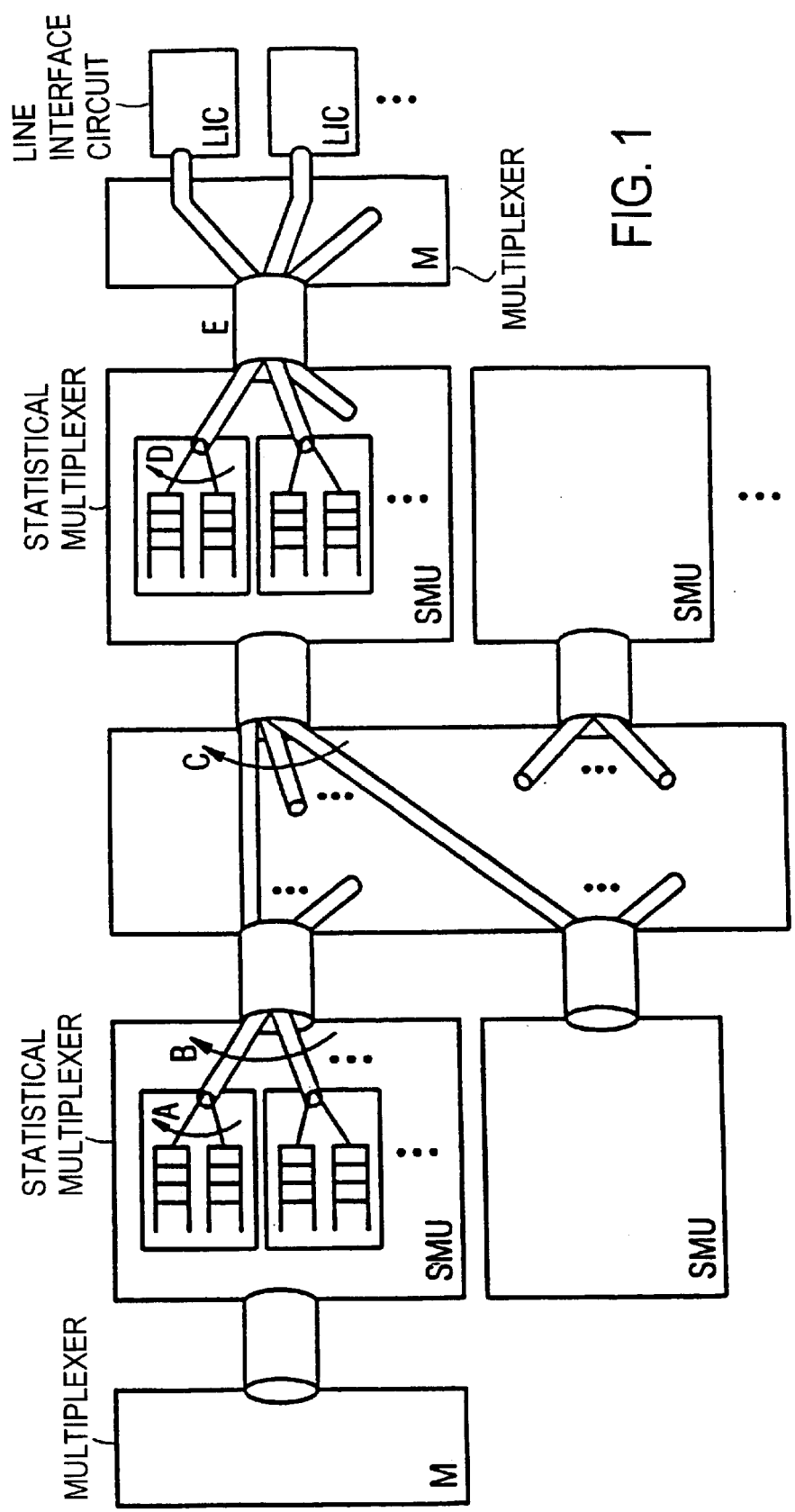
FIG. 1 shows a switching system in which the process according to the invention is to be executed.

FIG. 1 shows a switching system in which the process according to the invention is to be executed. In this system, multiplexing units M are shown in each case at the input end and at the output end, the multiplexing units M at the output end being connected to line interface circuits LIC.

Furthermore, statistical multiplexing units SMU are shown in which scheduling processes are executed. These processes are indicated here by means of the letters A, B, C, D. Furthermore, a transmission line E is shown to which a multiplicity of scheduler devices is connected at the input end via the statistical multiplexing unit SMU. At the output end, the link E is connected to the multiplexing unit M at the output end to the line interface circuits LIC. Within the switching system, the link E and the line interface circuits LIC must be considered to be critical with respect to the transmission capacity. Without special measures, ATM cells have to be discarded in order to be able to maintain the maximum peak bit rate in the transmission element E.

Figure 2:
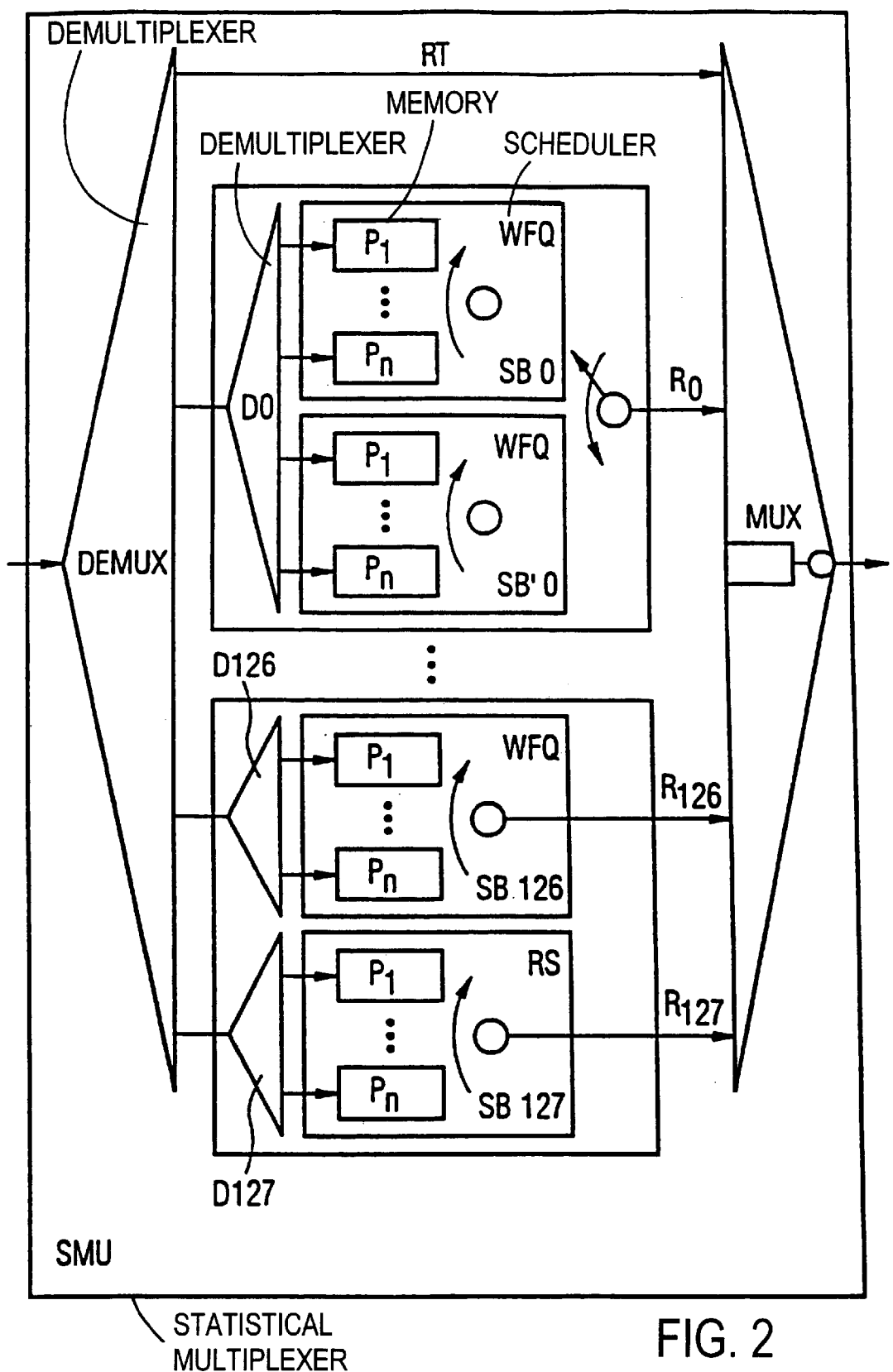
FIG. 2 shows a special embodiment of the process according to the invention.
Figure 3:
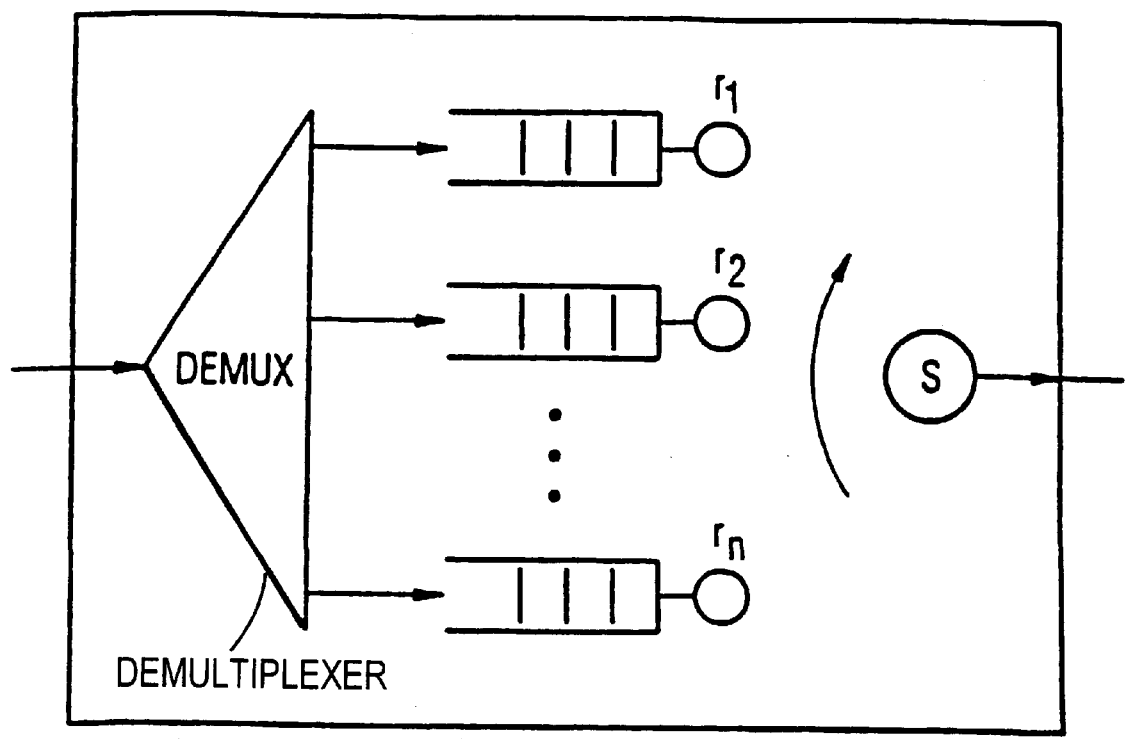
FIG. 3 shows the prior art forming the basis of the invention.

FIG. 2 shows in greater detail the statistical multiplexing unit SMU which is connected to the multiplexing unit M at the output end in FIG. 1. The ATM cells arriving via a connection element are supplied to the demultiplexing unit DEMUX. This unit connection-individually distributes the ATM cells via further demultiplexing units D0 . . . D127 to buffer memories P1 . . . Pn of the scheduler devices SB0 . . . SB127. The buffer memories are constructed as FIFO memories.

In the present illustrative embodiment, the ATM cells are read out of the buffer memories in accordance with a known scheduling process. In the scheduler devices SB0 . . . SB126, the known WEIGHTED FAIR QUEUEING SCHEDULING process WFQ is to be used. However, other processes are also possible and as an example of this the scheduler device SB127 is shown. In this case, a modified WEIGHTED FAIR QUEUEING SCHEDULING process RS(RATE SHAPING process) is used. These known processes form the second stage of the two-stage process. They are also independent of the first stage. As far as this is concerned, any scheduling process can be executed here.

When the WEIGHTED FAIR QUEUEING SCHEDULING process WFQ is used, the ATM cells are allocated different weighting factors $r_i$ as described initially. Using these weighting factors, the ATM cells are later read out in familiar manner and transmitted.

The first stage of the two-stage process according to the invention is executed in the multiplexing unit MUX. Here, factors R0 . . . R127 are allocated to the individual scheduler devices R0 . . . R127. This is the bit rate of the path or, respectively, of the link fed by the corresponding scheduler device. Furthermore, the factor R can be adjusted to any value. As a result, the peak bit rate on the subsequent transmission element can be limited and no ATM cells will be discarded.

Initially, therefore, one of the scheduler devices SB0 . . . SB127 is selected in accordance with the first stage of the two-stage process. In the present illustrative embodiment, this shall be the scheduler device SB0. After that, the corresponding buffer memory P1 . . . Pn is selected by the execution of the second stage of the two-stage process. This shall be, for example, buffer memory P1 of the scheduler device SB0. The ATM cell stored first is now transmitted to the multiplexing unit MUX and supplied to the other devices. According to FIG. 1, this is transmission section E, the multiplexer M at the output end shown there and the line interface circuits LIC. In this way, the ATM cells are conducted to the multiplexer MUX (first stage) in accordance with the WEIGHTED FAIR QUEUEING SCHEDULING process WFQ, where they are subjected to limiting of the peak bit rate (second stage). This is the limiting of the peak bit rate of a stream of ATM cells which, as a rule, represents a multiplicity of connections.

Allowance is made for this multiplicity by a multiplicity of virtual channel identifiers (VCI) in a virtual path (VPI). The peak bit rate is therefore the peak bit rate of the virtual paths.

In a further development of the invention, the scheduler devices are constructed in duplicate. In the present illustrative embodiment, this is indicated in the scheduler device SB0 by the scheduler device SB'0 arranged in parallel therewith by way of example.

In a further development of the invention, real-time ATM cells RT are supplied to the multiplexing unit MUX. These are ATM cells which are transmitted during an on-line call. The general rule is that these ATM cells must be processed with priority since otherwise there will be echoes on the lines. In the process according to the invention, these real-time ATM cells RT are allocated higher priority. However, this does not mean that the ATM cells in the buffer memories P1 . . . Pn cannot be transmitted to the multiplexer MUX as long as the real-time ATM cells RT are transmitted. The real-time ATM cells RT are transmitted to the multiplexing unit MUX without limiting the peak bit rate. Thus, the ATM cells RT comprise the ATM cells to be processed by the second stage of the two-stage scheduling process in the scheduler devices SB0 . . . SB127.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for transmitting ATM cells via connection elements, having at least one of multiplexing units and demultiplexing units:

scheduler devices arranged between said multiplexing units and said demultiplexing units, each of said scheduler devices having buffer memories, a stream of ATM cells which is allocated a multiplicity of virtual channel identifiers and virtual paths combining these virtual channel identifiers, and arbitrarily adjustable weighting factors representative of transmission capacity on subsequent connection elements allocated to the scheduler devices comprising the steps of:

selecting one of the scheduler devices as determined by the allocated weighting factors; and selecting at least one of the ATM cells from one of the buffer memories of the selected scheduler device and supplying the selected ATM cell to other devices.

2. The process as claimed in claim 1, wherein the ATM cells stored in the buffer memories of the scheduler devices are selected by a WEIGHTED FAIR QUEUEING SCHEDULING process.

3. The process as claimed in claim 1, wherein real-time ATM cells are supplied via a separate connection element arranged in parallel with the scheduler devices to a multiplexer with higher prioritization than is exhibited by ATM cells transmitted via the scheduler devices.

4. The process as claimed in claim 1, wherein the buffer memories are FIFO memories.

* * * * *